(12) United States Patent
Alexander (10) Patent No.: US 11,826,672 B1
(45) Date of Patent: Nov. 28, 2023

(54) SYSTEMS AND METHODS FOR SEPARATING COMPONENTS FROM FLUID STREAMS

(71) Applicant: Circle Verde Water Corporation, Bardstown, KY (US)

(72) Inventor: Joseph V. Alexander, Lexington, KY (US)

(73) Assignee: Circle Verde Water Corporation, Bardstown, KY (US)

( * ) Notice: Subject to any disclaimer, the term of this patent is extended or adjusted under 35 U.S.C. 154(b) by 0 days.

(21) Appl. No.: 17/976,119

(22) Filed: Oct. 28, 2022

(51) Int. Cl.
| | |
|---|---|
| *B01D 1/22* | (2006.01) |
| *C02F 1/04* | (2023.01) |
| *C02F 1/26* | (2023.01) |
| *B01D 1/00* | (2006.01) |
| *B01D 53/32* | (2006.01) |
| *B01D 53/76* | (2006.01) |
| *B01D 1/28* | (2006.01) |
| *C02F 103/10* | (2006.01) |
| *C02F 101/32* | (2006.01) |

(52) U.S. Cl.
CPC .......... *B01D 1/225* (2013.01); *B01D 1/0047* (2013.01); *B01D 1/2818* (2013.01); *B01D 53/326* (2013.01); *B01D 53/76* (2013.01); *C02F 1/042* (2013.01); *C02F 1/048* (2013.01); *C02F 1/26* (2013.01); *C02F 2101/32* (2013.01); *C02F 2103/10* (2013.01); *C02F 2303/10* (2013.01)

(58) Field of Classification Search
CPC .... B01D 1/0047; B01D 1/225; B01D 1/2818; B01D 53/326; B01D 53/76; C02F 1/042; C02F 1/048; C02F 1/26; C02F 2101/32; C02F 2103/10; C02F 2303/10
See application file for complete search history.

(56) References Cited

U.S. PATENT DOCUMENTS

| | | | |
|---|---|---|---|
| 2,974,725 A | 3/1961 | Reinhard et al. | |
| 3,119,752 A | 1/1964 | Andrew | |
| 3,152,053 A | 10/1964 | Lynam | |
| 3,190,817 A * | 6/1965 | Lustenader | B01D 1/225 |
| | | | 159/DIG. 13 |
| 3,216,042 A | 11/1965 | Werner | |

(Continued)

*Primary Examiner* — Jonathan Miller
(74) *Attorney, Agent, or Firm* — Holzer Patel Drennan (57) ABSTRACT

Systems and methods for separating components from a fluid stream are described. The systems and methods described herein may be specifically well suited for separating solids, hydrocarbons, chemicals, non-evaporable components, etc., from wastewater produced by oil and gas recovery. The systems and methods may generally include the use of a heat exchanger through which a fluid stream is passed to thereby evaporate some or all of the fluid stream. The heated stream exiting the heat exchanger may include vapor, liquids and/or solids. This heated stream is then subjected to phase separation to separate a vapor stream from a liquid/solids stream. The vapor stream is then transported back to the heat exchanger where it is used to transfer heat from the vapor stream to the fluid stream. During the operation of the heat exchanger, a scraping system may be used to scrape the one or more surfaces of the passage through which the fluid stream flows in order to prevent buildup of solids and liquids thereon.

18 Claims, 8 Drawing Sheets

(56) References Cited

U.S. PATENT DOCUMENTS

| | | | |
|---|---|---|---|
| 3,274,076 A * | 9/1966 | Ridgway | B01D 3/30 |
| | | | 202/187 |
| 3,385,354 A | 5/1968 | Bevarly | |
| 3,587,729 A | 6/1971 | Eisenmann | |
| 5,228,503 A | 7/1993 | Smith | |
| 5,485,880 A | 1/1996 | Zeuthen | |
| 5,724,828 A * | 3/1998 | Korenic | F28C 1/14 |
| | | | 261/138 |
| 6,375,803 B1 * | 4/2002 | Razzaghi | B01D 1/2856 |
| | | | 159/901 |
| 6,551,466 B1 * | 4/2003 | Kresnyak | B01D 1/2856 |
| | | | 159/901 |
| 6,908,533 B2 * | 6/2005 | Zebuhr | B01D 5/0015 |
| | | | 202/172 |
| 7,837,768 B2 * | 11/2010 | Sanderson | B01D 19/0005 |
| | | | 210/103 |
| 8,858,758 B2 * | 10/2014 | Zebuhr | C02F 1/08 |
| | | | 159/6.3 |
| 8,986,509 B2 | 3/2015 | Batty et al. | |
| 9,540,250 B2 * | 1/2017 | Schubert | B01D 5/0057 |
| 9,770,676 B2 * | 9/2017 | Zebuhr | B01D 1/225 |
| 9,962,626 B2 * | 5/2018 | Zebuhr | B01D 3/065 |
| 10,465,491 B2 | 11/2019 | Moore | |
| 10,864,482 B2 | 12/2020 | Katz | |
| 11,465,918 B2 * | 10/2022 | Bitterly | B01D 3/08 |
| 2012/0037488 A1 * | 2/2012 | Zebuhr | B01D 1/227 |
| | | | 202/185.1 |
| 2013/0299361 A1 * | 11/2013 | Wylie | C02F 1/461 |
| | | | 204/273 |
| 2015/0336024 A1 * | 11/2015 | Zebuhr | B01D 1/225 |
| | | | 202/175 |
| 2020/0399143 A1 * | 12/2020 | Bitterly | C02F 1/06 |

\* cited by examiner

SYSTEMS AND METHODS FOR SEPARATING COMPONENTS FROM FLUID STREAMS

TECHNICAL FIELD

This disclosure relates to systems and methods for separating components from fluid streams. In some embodiments, the systems and methods described herein are designed for use in the oil and gas industry, such as for separating components from wastewater or produced water resulting from typical petroleum production techniques.

BACKGROUND

A common problem in the oil and gas industry is the handling of wastewater produced by typical oil and gas extraction and processing. This wastewater typically includes hazardous and/or toxic materials, and is thus unsuitable for, e.g., releasing into natural water sources, such as natural lakes and streams. In some cases, the wastewater is handled by collecting the wastewater in a tailings ponds, tanks or other fluid storage apparatus. But such storage may not actually treat or solve the existence of hazardous wastewater. Furthermore, such storage still poses the threat of wastewater seeping into and contaminating groundwater systems.

Accordingly, a need continues to exist for effective systems and methods for treating wastewater. Ideal systems and methods would create clean water, separate and collect any components in the wastewater that may have beneficial uses, and be highly energy efficient.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some embodiments, a system for separating components from a fluid stream is disclosed, the system generally including a heat exchanger and a phase separator. The heat exchanger may include a fluid passage and a vapor passage, the fluid passage and vapor passage being configured such that heat can be transferred from the vapor passage to the fluid passage to heat fluid flowing in the fluid passage. The fluid passage of the heat exchanger further includes a fluid inlet configured for conveying a fluid stream into the fluid passage of the heat exchanger, and a fluid outlet configured for passing a heated fluid stream out of the fluid passage of the heat exchanger. The fluid passage of the heat exchanger further includes one or more moveable scrapers positioned within the heat exchanger and configured to scrape an interior surface of the fluid passage. The vapor passage of the heat exchanger includes a vapor inlet configured for conveying a vapor stream into the vapor passage of the heat exchanger, and a vapor outlet configured for passing a cooled vapor stream out of the vapor passage of the heat exchanger. The phase separator of the system includes an inlet in fluid communication with the fluid outlet of the heat exchanger, and an outlet configured for passing a vapor stream out of the phase separator, the outlet being in fluid communication with the vapor inlet of the heat exchanger. The phase separator is configured to separate the heated fluid stream into a vapor stream and a liquid/solid stream.

In some embodiments, a method for separating components from a fluid stream is disclosed. The method can generally include the steps of passing the fluid stream through a heat exchanger to thereby heat the fluid stream and convert at least a portion of the fluid stream into a vapor; while the fluid stream is passing through the heat exchanger, continuously scraping the interior surfaces of the heat exchanger that are exposed to the fluid stream to prevent components of the fluid stream from depositing on the interior surfaces; performing phase separation on the heated fluid stream exiting the heat exchanger to thereby form a vapor stream and a liquid/solid stream; and passing the vapor stream though the heat exchanger to thereby transfer heat from the vapor stream to the fluid stream.

These and other aspects of the technology described herein will be apparent after consideration of the Detailed Description and Figures herein. It is to be understood, however, that the scope of the claimed subject matter shall be determined by the claims as issued and not by whether given subject matter addresses any or all issues noted in the Background or includes any features or aspects recited in the Summary.

BRIEF DESCRIPTION OF THE DRAWINGS

Non-limiting and non-exhaustive embodiments of the disclosed technology, including the preferred embodiment, are described with reference to the following figures, wherein like reference numerals refer to like parts throughout the various views unless otherwise specified.

DETAILED DESCRIPTION

Embodiments are described more fully below with reference to the accompanying Figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Described herein are various embodiments and aspects of systems and methods for separating components from fluid streams. In one particular, though non-limiting application, the methods and systems described herein are suitable for use in the treatment of wastewater produced from oil and gas production. For example, the methods and systems used herein are capable of treating produced water that typically results from petroleum production. The wastewater created from oil and gas production may include various solids (suspended or dissolved), non-evaporable components, hydrocarbons, acidic material, and valuable compounds. As such, various aspects of the systems and methods described herein are aimed at separating the components of the wastewater so as to produce clean water while also managing and/or collecting the separated components.

Figure 1:
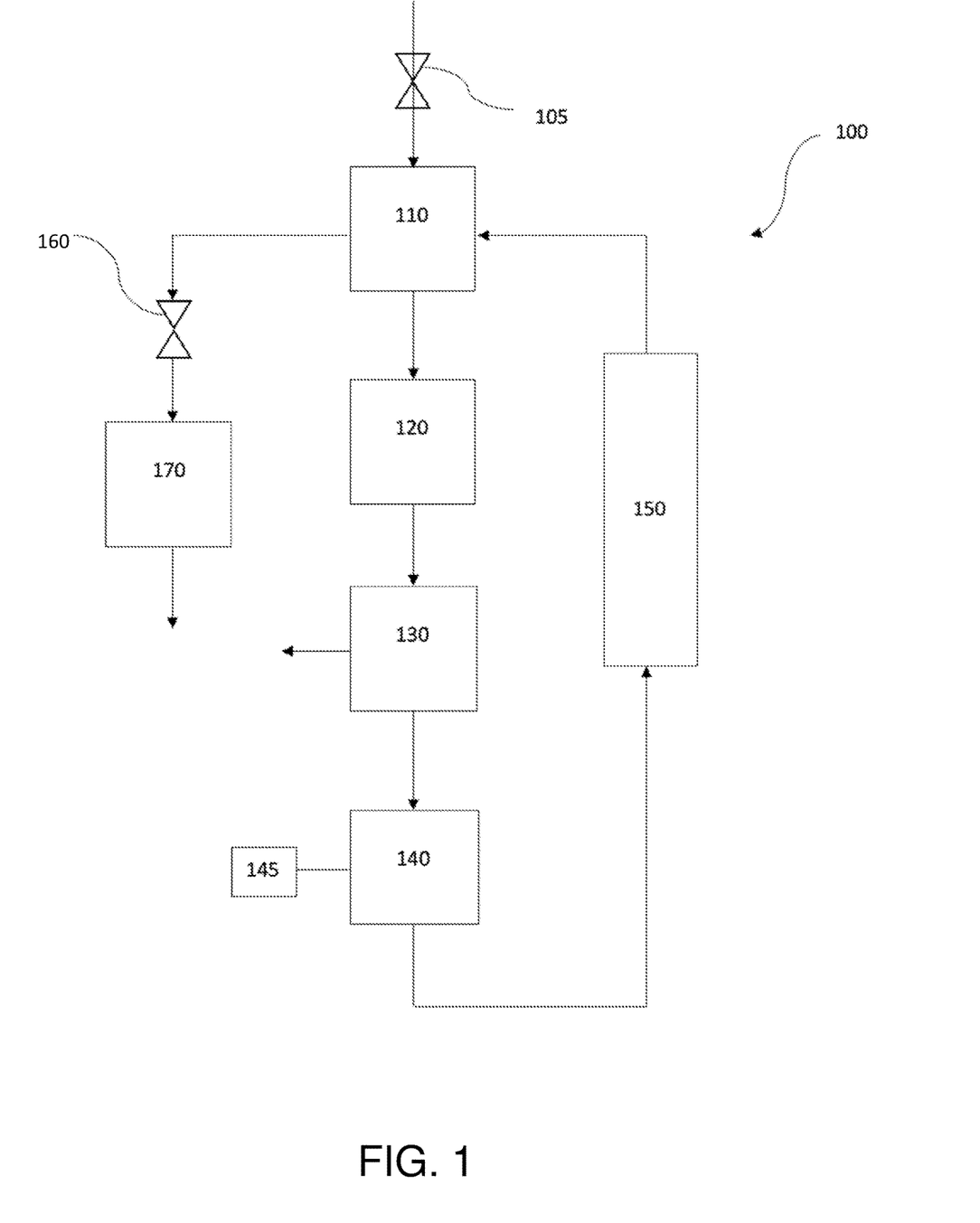
FIG. 1 is a schematic illustration of a system for separating components from a fluid stream configured in accordance with various embodiments described herein.

With reference to FIG. 1, a system 100 for separating components from a fluid stream is shown. FIG. 1 generally illustrates an overall design for the system 100, with further detail on individual components of system 100 and optional additional sub-systems (not shown in FIG. 1) provided below. System 100 generally includes a heat exchanger 110, a boiler 120, a phase separator 130, a compressor 140, an electrochemical cell 150, a pressure regulating valve 160, and an air cooler 170. The heat exchanger 110, phase separator 130 and compressor 140 work in combination to perform the primary functions of the system 100, and as such, it should be appreciated that various components of system 100 (e.g., boiler 120, electrochemical cell 150, pressure regulating valve 160, air cooler 170) may be optional in some implementations of the system 100.

Heat exchanger 110 is generally provided to heat and at least partially evaporate a fluid stream introduced therein. As shown in FIG. 1, the system may include a valve 105 for controlling the flow of a fluid into the heat exchanger 110. The heat exchanger 110 may be of any suitable type for transferring heat to the fluid stream being passed therethrough. As discussed in greater detail below, the heat exchanger 110 may have a shell and tube configuration, with the fluid stream passing through the tube side of the heat exchanger 110. As also described in greater detail below, the heat exchanger may include one or more rotating blades or scrapers configured to remove material from the interior portions of the passage of the heat exchanger 110 through which the fluid flows during operation, thus preventing the buildup of solid materials on the interior surfaces of fluid passage of the heat exchanger.

As noted previously, heat exchanger 110 operates to heat the fluid stream introduced therein and preferably convert most or all of a fluid component of the fluid stream into vapor. In one non-limiting example, the fluid stream includes predominantly water and the heat exchanger heats the fluid stream to thereby produce steam. The heat exchanger may be capable of evaporating one or more components of the fluid stream, depending on the boiling point of the various fluid components included within the fluid stream. In embodiments wherein the fluid stream includes water and other fluid components, the vapor component of the stream exiting the heat exchanger 110 may have non-water components entrained therein. Additionally, because the fluid stream introduced into heat exchanger may also include solids and non-evaporable components, the stream leaving the heat exchanger may also continue to include these solid and/or liquid components.

In some embodiments, system 100 includes a boiler 120 that is in fluid communication with the heat exchanger 110 such that the stream of vapor, solids, and non-evaporable liquids (herein referred to as the heated fluid stream) may be introduced into the boiler 120. The boiler 120 may generally be any type of apparatus suitable for further heating the heated fluid stream, and the term "boiler" as used herein should not be taken in a limiting sense. When introduced into the boiler 120, the heated fluid stream is subjected to further heating that may result in additional evaporation of, e.g., water not evaporated in the heat exchanger, other evaporable components included in the stream with higher boiling points, etc. As such, the boiler 120 helps to further condition the heated fluid stream for treatment by the phase separator 130.

In some embodiments, the boiler 120, including the fluid conduit fluidly connecting the heat exchanger 110 and the boiler 120, may include an auger or conveyor system to ensure that any solids, precipitated components or other non-flowable components of the heated fluid stream are efficiently conveyed into and through the boiler 120. Use of an auger or conveyor system within the boiler 120 further helps to prevent buildup of solid material within boiler 120. The specific type of auger or conveyor system used in such embodiments is generally not limited.

The heated fluid stream, having been further heated by the boiler 120, is next transported to the phase separator 130. The purpose of the phase separator is to separate vapor from any remaining liquids and solids in the heated fluid stream. As such, any apparatus capable of performing such phase separation can be used for the phase separator 130. A rotary airlock may be used within the phase separator 130, particularly in the case when the heat exchanger 110 and boiler 120 are configured for full/complete evaporation of all water and evaporable liquids in the fluid stream, such that only solids and a vapor stream (no liquids) enter the phase separator 130. Alternatively, if the heat exchanger 110 and boiler 120 only partially evaporate the liquids in the fluid stream, a modulating valve may be used within the phase separator 130 to thereby permit the liquid components (which may contain suspended and dissolved solids therein) to leave the phase separator 130 without allowing air to enter or gas/vapor to escape.

As shown in FIG. 1, the phase separator 130 produces two streams—a vapor stream and a liquid/solid stream (which may be solids only, in some embodiments). Further optional treatment of the liquid/solid stream is discussed in greater detail below with respect to FIG. 5. The vapor stream produced by the phase separator is ultimately destined for the heat exchanger 110, wherein it is used to transfer heat to the fluid stream. However, the system 100 may optionally include one or more components used to process, treat and/or otherwise condition the vapor stream prior to its introduction into the heat exchanger 110.

In some embodiments, the vapor stream exiting the phase separator 130 is transported to a compressor 140. The compressor 140 of system 100 is used to increase the pressure of the vapor stream. The term compressor as used herein should be construed broadly, and may also include, e.g., a blower or any other mechanical system capable of increasing the pressure of the vapor stream. If the compressor 140 is driven by an electric motor, a variable frequency drive 145 or other method of controlling the speed of the compressor 140 may optionally be used to increase the flexibility of the system 100 and provide better control of the system's operations.

The vapor stream leaving compressor 140 may next be transported to an electrochemical cell 150. The aim of the electrochemical cell 150 is to oxidize any oxidizable components present in the vapor stream. In some embodiments, the electrochemical cell 150 is used to establish a plasma that can be used to perform the oxidation of contaminants in the vapor stream. The electrochemical cell 150 may also be used as an opportunity to introduce reagents and/or chemical additives into the vapor stream to further treat, clean or otherwise condition the vapor stream.

As discussed previously, the ultimate destination for the vapor stream produced by the phase separator 130 is to heat exchanger 110 to serve as a source of heat that can be transferred to the fluid stream. In embodiments where the heat exchanger 110 is a shell and tube heat exchanger, the vapor stream may pass through the shell side of the heat exchanger 110 in a counter current direction to the flow of the fluid stream through the tube side of the heat exchanger 110.

In some embodiments, the vapor phase passing through the heat exchanger 110 will lose/transfer sufficient heat that it will convert (at least partially) to a liquid phase. In such embodiments, a liquid stream (which may be predominantly water in some embodiments) exits the heat exchanger 110.

Optional apparatus that may be included as part of system 100 downstream of the liquid stream outlet of the heat exchanger 110 includes a pressure regulating valve 160 and an air cooler 170. A pressure regulating vale 160 may be used to maintain a set pressure of the stream leaving compressor 140. Air cooler 170 may be used to further cool the liquid stream exiting the heat exchanger 110. Cooling the liquid stream in air cooler 170 can help to ensure that all vapor is condensed into the liquid stream and to ensure the temperature of the liquid stream leaving the system 100 is within specified tolerances.

As noted previously, components such as the boiler 120 and the electrochemical cell 150 may be optional components of the system 100. It should be appreciated that any combination of these components can be used in system 100. For example, the system may include boiler 120 but not electrochemical cell 150, in which case the vapor stream leaving the compressor 140 is transported directly to the heat exchanger 110. In another example, the system 100 may include an electrochemical cell 150 but not a boiler 120, in which case it should be appreciated that the heated fluid stream leaving heat exchanger 110 is transported directly to the phase separator 130.

In the system 100 described herein, various streams are conveyed from one component of the system 100 to another component of the system 100. While not discussed in detail herein, it should be appreciated that the various streams can be conveyed from component to component using any suitable conduits, such as piping of any suitable material, dimensions, etc. The system 100 may also include various valves, regulators, gauges (e.g., pressure sensors, temperature sensors, etc.) as would be well known to those of ordinary skill in the art in order to carry out and control the processes described herein.

Figure 2:
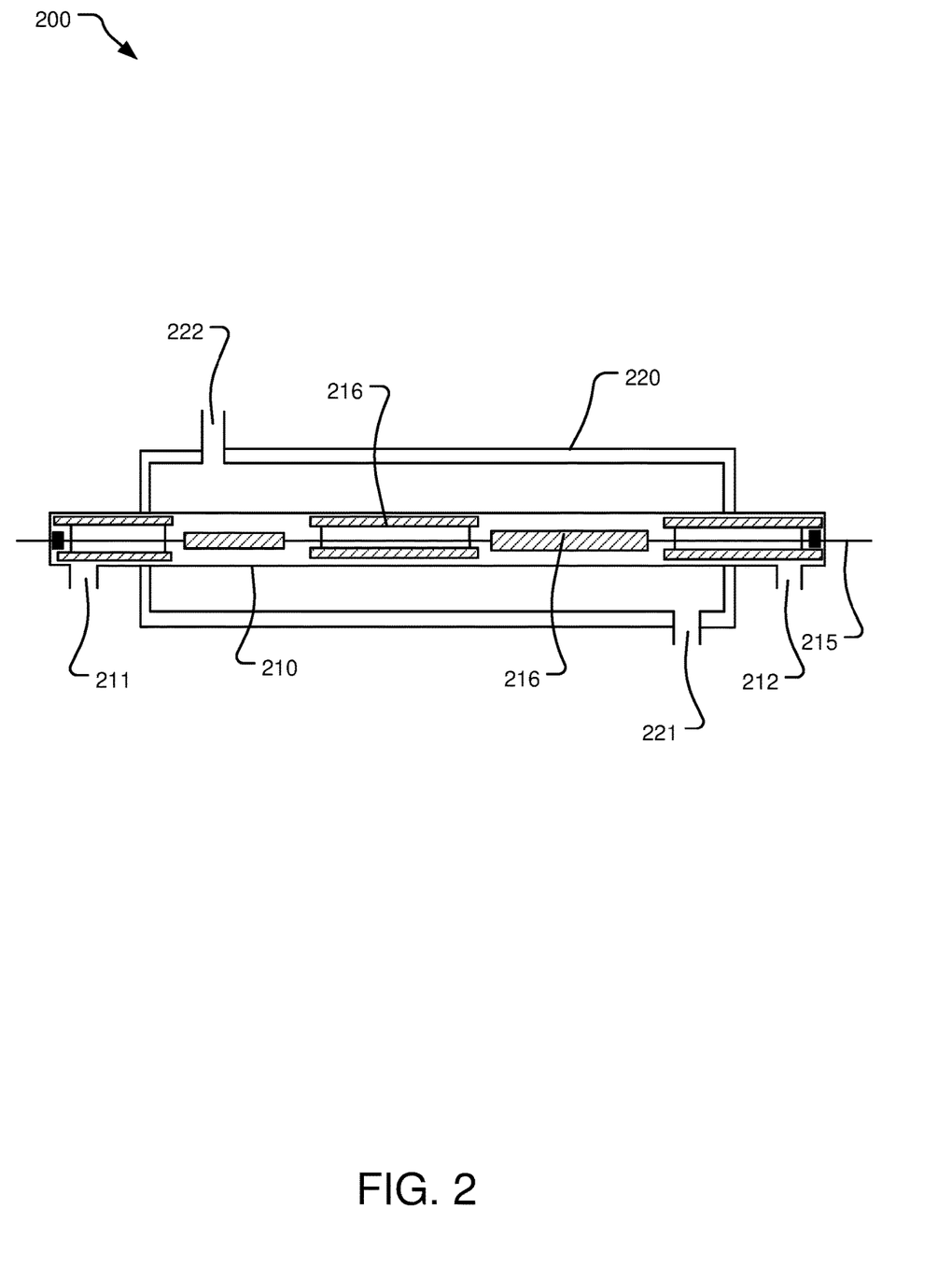
FIG. 2 is a cross-sectional side view of a heat exchanger configured in accordance with various embodiments described herein, the heat exchanger being suitable for use in the system illustrated in FIG. 1.
Figure 3:
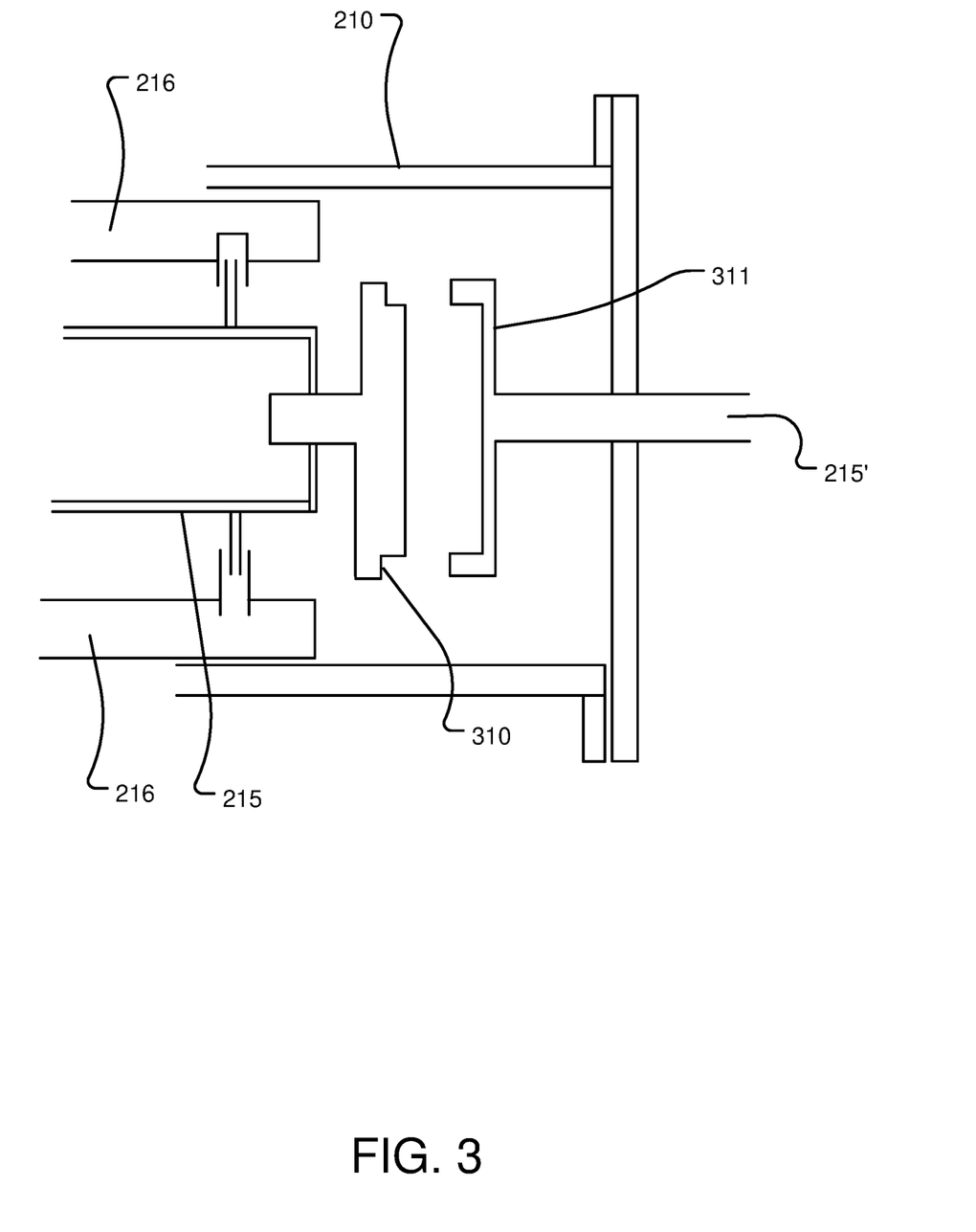
FIG. 3 is a cross-section side view of a portion of the heat exchanger illustrated in FIG. 2.

With reference to FIGS. 2 and 3, embodiments of a heat exchanger suitable for use as the heat exchanger 110 in system 100 are illustrated. FIG. 2 generally shows a side cross-sectional view of a heat exchanger 200 that is equipped with blades or scrapers 216 to help prevent the buildup of solid particulate on the interior walls of the passage through which the fluid stream passes. The heat exchanger 200 shown in FIGS. 2 and 3 has a general shell and tube configuration, including a tube 210 and a shell (or jacket) 220 that is concentrically wrapped around the tube 210. Tube 210 provides a passage through which fluid stream (e.g., wastewater or any other fluid including dissolved or suspended solids) flows from one side of heat exchanger 200 to the other. In this regard, tube 210 may include an inlet port 211 at one end of tube 210, such that the fluid stream can be flowed into the tube 210 of heat exchanger, and outlet port 212 located at an opposite end of the tube 210 and which allows for the fluid stream to exit the tube 210 of the heat exchanger 200.

Within tube 210 is a scraping system configured to continuously or periodically scrape and/or remove material from the interior walls of tube 210 and thus prevent the buildup of solid deposits on the interior walls of tube 210. Because fluid streams passing through tube 210 may include solid or viscous liquid materials that are capable of adhering to or depositing the walls of tube 210, the scraper system included in heat exchanger 210 can be beneficial to the operation of the heat exchanger 210 and the system 100 overall. Material such as precipitated solids, hydrocarbons, salts and other contaminants can be present in the fluid stream, and the scraping system can help to ensure these materials do not buildup on the walls of tube 210. The scraping system can also help to distribute the fluid stream about the tube 210 and thus improve heat transfer and uniformity of heating of the fluid stream.

In some embodiments, the scraping system generally includes a rotating shaft 215 that extends the most or all of the length of the tube and is positioned generally along the central longitudinal axis of the tube 210. The rotating shaft 215 may be rotated using a motor (not shown) coupled to an end of the rotating shaft 215. Attached to the rotating shaft 215 within the tube 210 and generally extending radially outward from the rotating shaft 215 are a series of blades or scrapers 216. The dimensions of the scrapers 216 are such that they contact or come close to contacting the interior walls of the tube 210 as the rotating shaft 215 rotates. While in some embodiments it may be preferable that the blades or scrapers 216 actually contact the interior walls of the tube 210, it is also possible for the blades or scrapers 216 to come close to the interior walls of the tube 210 without actually contacting the interior walls of the tube 210 and still remove material adhered to the interio walls of the tube 210. Each scraper 216 is capable of removing material from the entire circumference of the tube 210 at its longitudinal position along the rotating shaft 215. As shown in FIG. 2, one configuration of the scraping system may provide multiple scrapers 216 at various longitudinal sections along the length of the tube 210. For example, FIG. 2 shows five longitudinal sections of the tube 210, with a group of scrapers 216 at each section. A group of scrapers 216 at a first section may be rotationally offset from a group of scrapers 216 in an adjacent section so that all scrapers 216 within tube 210 are not in the same rotational position along the entire length of the tube 210. FIG. 2 shows the scrapers 216 in a first section being rotationally offset by 90 degrees from scrapers in an adjacent section. However, it should be appreciated that any rotational offset can be used. The number of scrapers 216 per section is also not limited.

Figure 3A:
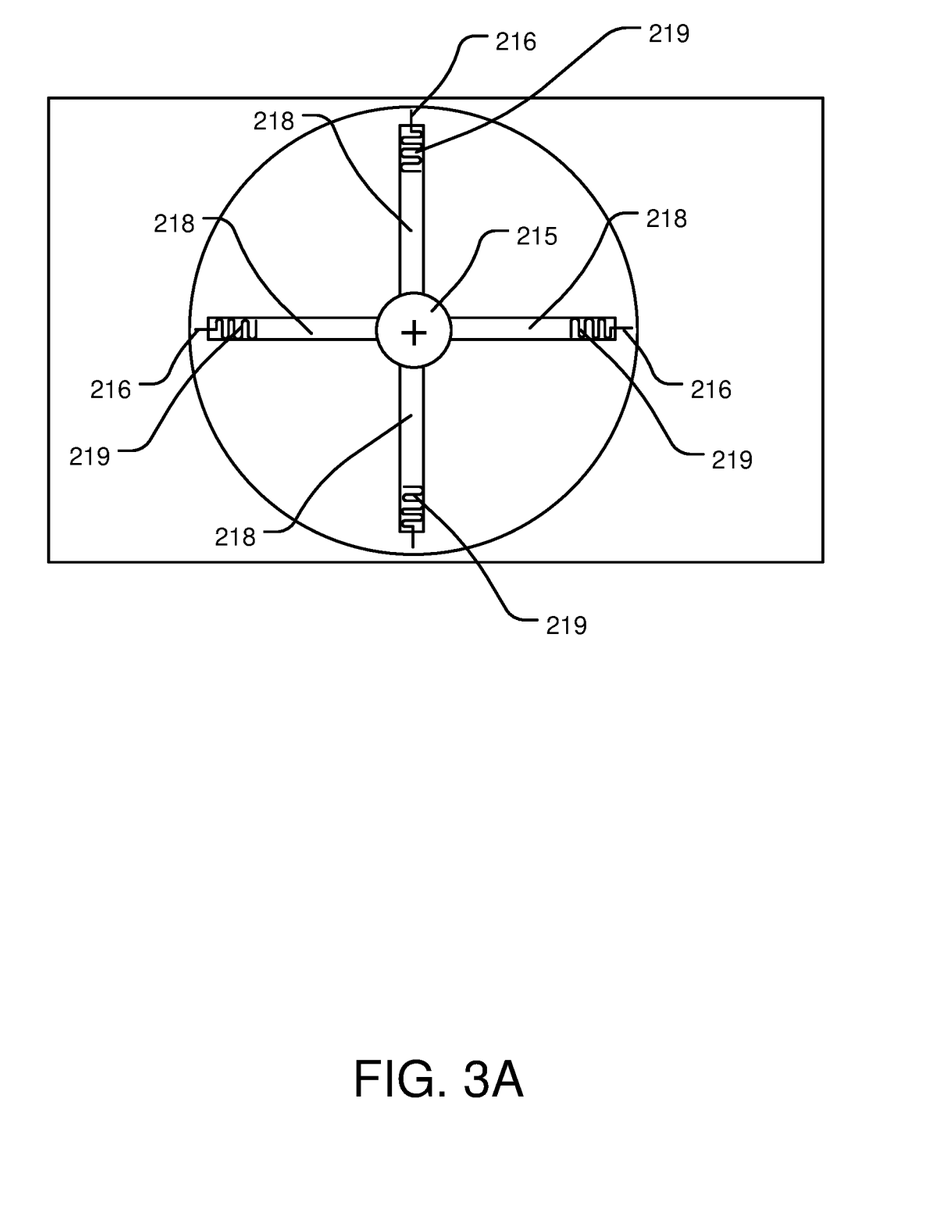
FIG. 3A is a cross-section end view of a portion of the heat exchanger illustrated in FIG. 2

With reference to FIG. 3A, one embodiment for the configuration and alignment of a group of scrapers 216 at a first section of the tube 210 is shown. In this embodiment, four scrapers 216 are provided, each scraper 216 positioned 90 degrees from an adjacent scraper 216. Each scraper 216 is connected to the rotating shaft 215 via a support arm 218 that is connected with the rotating shaft 215 at one end and connected to the scraper 216 at the opposite end. FIG. 3A further illustrates that the connection between the scraper 216 and the distal end of the support arm 218 may include a spring 219 that is biased radially outwardly. The spring 219 ensures that that the scraper 216 is forced radially outwardly towards the interior wall of the tube 216, thus ensuring continuous contact between the scraper 216 and the interior wall of the tube 210 or that the radially outer edge of the scraper 216 stays in close proximity to the interior wall of the tube 210 (even if the outer edge of blade 216 does not actually contact the interior wall of the tube 210). While not shown in FIG. 3A, each scraper 216 may further include a sensor that measures the deterioration of the scrapers 216. When a scraper 216 is measured as being sufficiently deteriorated (such as when the scraper 216 is worn down such that it no longer continuously contacts the wall of the tube 210), the sensor can send an alert indicating that the scraper 216 should be replaced.

Shell 220 generally surrounds and directly abuts tube 210, with the shell 220 being concentrically aligned with the tube 210. The shell 220 provides a passage for steam or other hot vapor stream to pass through, typically in a direction countercurrent to the direction that fluid stream is flowed through the tube 210. Similar to tube 210, shell 220 may include an inlet port 221 at one end for passing vapor into the shell 220, and an outlet port 222 at the opposite end for vapor (partially or fully condensed into a liquid) to exit the shell 220. While not shown in FIG. 2, the shell 220 may include a system of baffles configured to ensure even distribution of the vapor around the entire circumference of the shell 220.

When passing vapor through shell 220, heat from the vapor is transferred to the fluid stream in tube 210, which desirably results in evaporating at least a portion of the fluid stream and condensing at least a portion of the vapor. The evaporated fluid stream, including any solids and non-evaporated liquids, may exit the tube 210 and then be processed as discussed in greater detail previously with respect to the system 100 of FIG. 1. Similarly, the condensed vapor (in liquid form) may exit the shell 220 and then be processed as discussed in greater detail previously with respect to the system 100 of FIG. 1.

While the heat exchanger 200 shown in FIG. 2 is illustrated as including a single tube 210 and single shell 220, it should be appreciated that alternative configurations can be used wherein multiple tubes 210 are provided, each of the tubes 210 being surround by its own shell 220, or a plurality 210 tubes being surround by one shell 220. When multiple tubes 210 are used, each tube 210 may include its own scraping system as previously described.

With reference to FIG. 3, the scraping system may include a coupling system that allows for the shaft 215 having scrapers 216 connected thereto to be easily disconnected and removed from the tube 210. This configuration allows for easy replacement or repair of scrapers 216 (such as when the scrapers 216 have worn down and are no longer effective in removing solids from the wall of tube 210) with minimal downtime in the operation of the overall system. As shown in FIG. 3, the coupling system may include one end of rotating shaft 215 having a mechanical coupling 310 that mates with a mechanical coupling 311 located on the end of a shaft 215' extending from motor used to rotate the rotating shaft 215. Any suitable mechanical coupling between rotating shaft 215 and the shaft 215' extending from motor can be used. In some embodiments, coupling 310 is a female coupling and coupling 311 is a male coupling, though the opposite configuration can also be used. In order to facilitate removal of a decoupled rotating shaft 215 from the tube 210, the tube 210 may include a door or removable seal that allows the rotating shaft 215 (with scrapers 216 attached thereto) to be moved along the longitudinal axis of the tube 215 and out of the tube 215.

It should be appreciated that the configuration of the scraper system described previously wherein the blades or scrapers rotate about the central shaft to clear material from a section of the circumference of the tube is not the only configuration that can be used for the scraper system. Any configuration in which one or more blades clear material from the interior surface of the tube may be used, regardless of the direction in which the blades or scrapers are moved and/or the orientation of the blades. In one non-limiting alternate embodiment to the scraper system illustrated in FIGS. 2, 2A and 3, the blades or scrapers move in the direction of the length of the tube to clear material from the tube, such as by moving along tracks built into the interior surface of the tube or by moving back and forth along the length of a central shaft positioned within the tube. In such embodiments, the blades or scrapers may have an outer edge that is shaped to match the cross-sectional shape of a portion of the tube to help ensure the blade clears material from the tube. In this configuration, the blades or scrapers may be oriented generally perpendicular to the longitudinal axis of the tube, though angled orientations can also be used. The blades or scrapers can be designed to move the entire length of the tube, or sets of blades or scrapers can be provided along the length of the tube such that each set of blades or scrapers move along only a portion of the length of the tube. Any number of blades or scrapers can be used in these alternate configurations, and any rotational offset can be used between adjacent blades. In one embodiment, a first blade or scraper may cover, e.g., 30 degrees of the circumference of the tube and may be positioned forward along the length of a tube from a second blade that is rotationally offset from the first blade by 15 degrees but also covers 30 degrees of the circumference of the tube. In this configuration, the first blade moves along the length of the tube removing material therefrom, while the second blade follows behind the first and clears material from at least a portion of the interior surface already covered by the first blade. This configuration can ensure that material that may not have been removed by the first blade is removed by the second trailing blade.

It should further be appreciated that the configuration shown in FIG. 3 for removing a scraping system from the tube can be used regardless of the specific configuration of the scraping system.

As discussed previously, the system 100 illustrated in FIG. 1 may include optional sub-systems for carrying out additional processing on various streams produced by the system 100. Any combination of these sub-systems may be added to the system 100 as desired.

Figure 4:
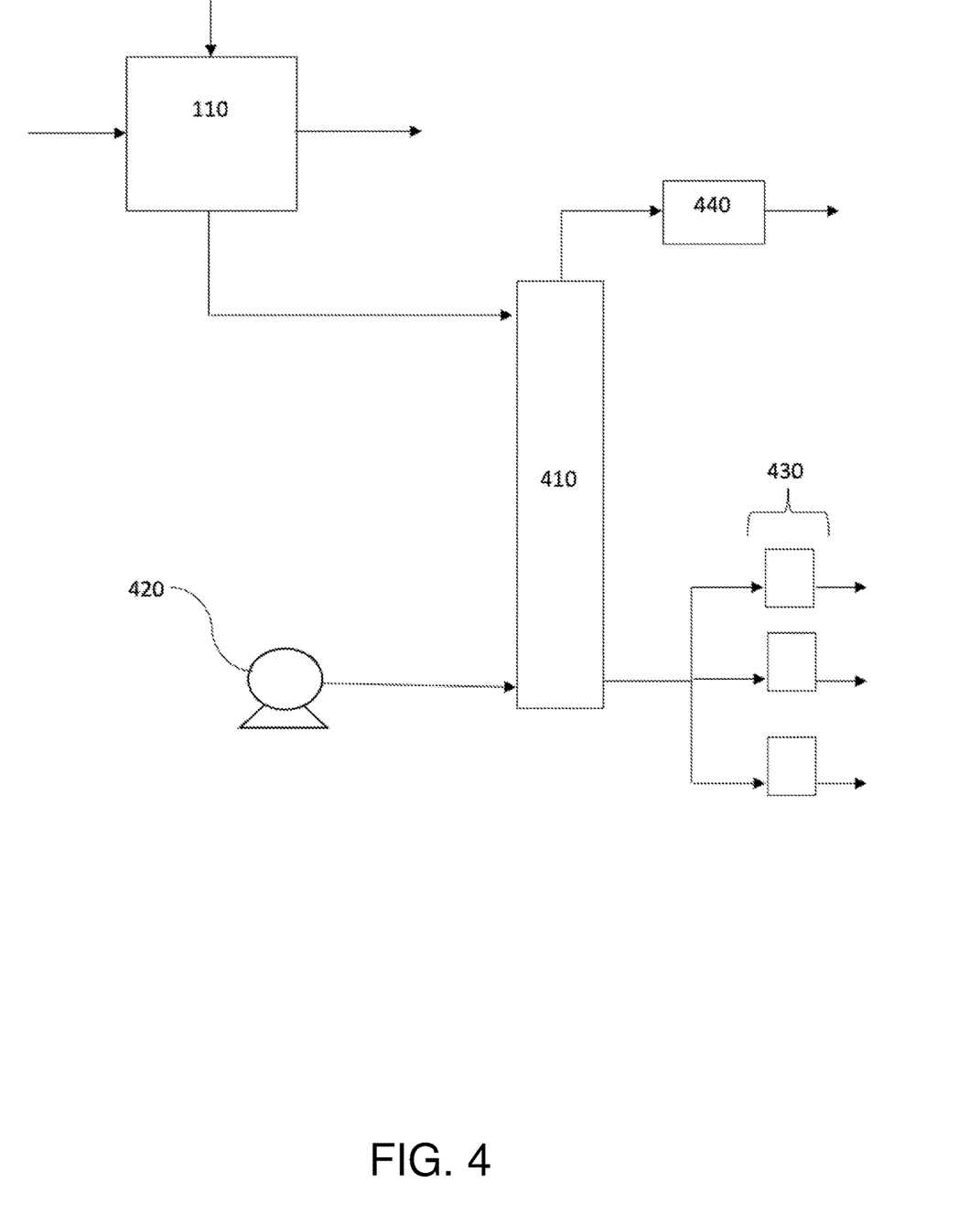
FIG. 4 is schematic illustration of an optional addition to the system shown in FIG. 1.

With reference to FIG. 4, a first optional sub-system is used for further treatment of the condensed liquid (resulting from the removal of heat from the vapor passed through the heat exchanger 110) exiting the shell 220 of heat exchanger 110. This stream of liquid, which may be predominantly water, may still include some contaminants. As such, FIG. 4 illustrates a contactor 410 through which the condensed vapor in liquid form can be passed to remove contaminants or impurities. Countercurrent to the flow of liquid through the contactor 410, air may be blown. The air may be generated by pump 420. The air acts to strip away the majority of, e.g., any hydrocarbons contained within the liquid stream entering the contactor 410. As a result, the air leaving the contactor 410, and having hydrocarbons entrained therein, may then be optionally passed through an absorbent-containing vessel 440 prior to discharge of the air to the atmosphere. The purified liquid stream leaving contactor 410 may optionally be stored in tanks 430 to permit analysis and to certify that the liquid meets discharge specifications prior to discharge to the environment or subsequent user. Any apparatus suitable for allowing air to move counter currently through the liquid may be used for contactor 410. In one example, the contactor 410 is a bubbler in which air is bubbled up through the liquid as it flows down through the contactor 410.

Figure 5:
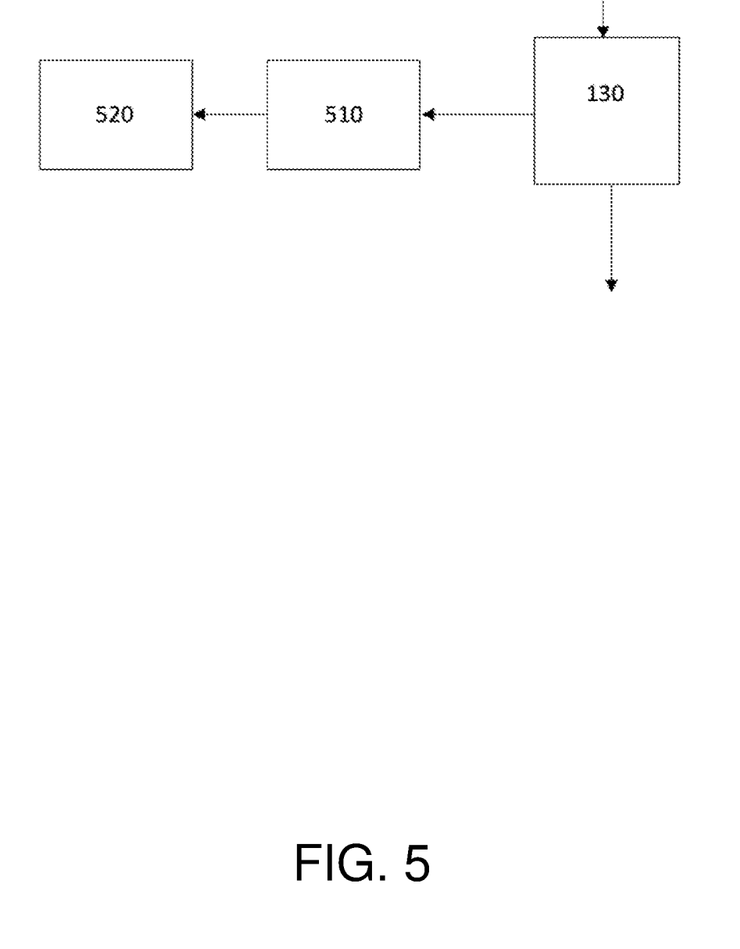
FIG. 5 is a schematic illustration of another optional addition to the system shown in FIG. 1.

FIG. 5 provides an illustration of yet another optional sub-system that may be added to system 100 shown in FIG. 1. The sub-system of FIG. 5 is generally designed to further treat the solid/liquid phase created by phase separator 130. In some embodiments, the sub-system of FIG. 5 includes an incinerator 510. The aim of incinerator 510 may be to incinerate any hydrocarbons (or any non-volatile components) present in the solid/liquid phase exiting phase separator 130. Any suitable device for incinerating hydrocarbons and/or non-volatile components can be used for incinerator 510. The solids remaining following incinerator 510 can be processed at unit 520 to recover potash and other economically valuable minerals. Unit 520 can be used for carrying out various industrial practices, such as, e.g., flotation, ion exchange resins, absorbent resins, or various other extraction techniques including but not limited to solid/liquid and liquid/liquid extraction.

In some embodiments, the liquid/solid stream leaving the phase separator 130 can be exposed to a solid material configured to absorb one or more components from the liquid stream and thereby separate these components from the liquid stream. These solids may include ion exchange resins, activated charcoal, reactive absorbent materials and resins, and the like. Passing the liquid/solid stream through a solid capable of absorbing (and thereby separating) components may be used, e.g., to remove hydrocarbons or hydrogen sulfide from the liquid stream.

Figure 6:
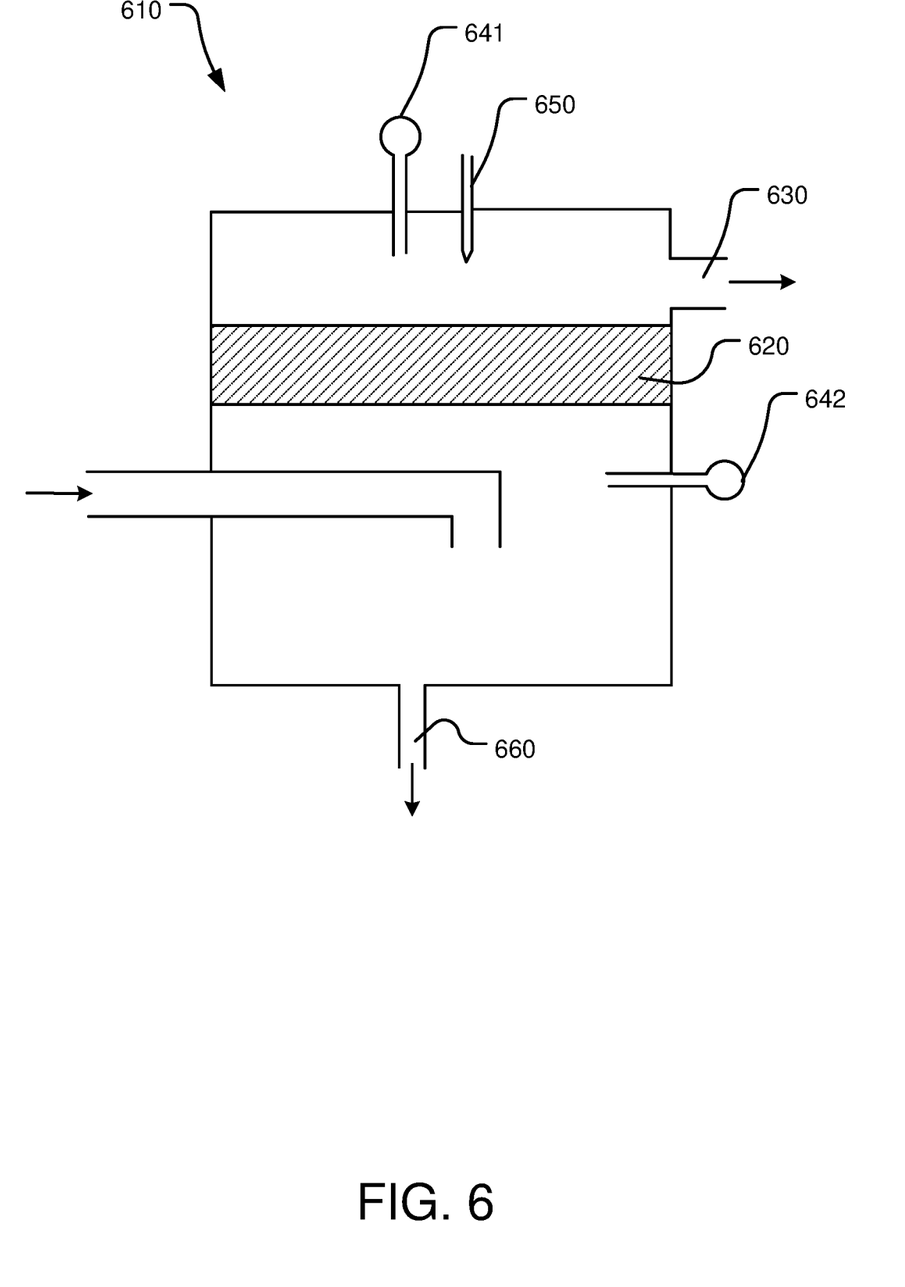
FIG. 6 is a schematic illustration of still another optional addition to the system shown in FIG. 1.

FIG. 6 provides an illustration of still another optional sub-system that may be added to system 100 shown in FIG. 1. The sub-system of FIG. 6 is generally designed to filter the vapor stream entering compressor 140, and more specifically, to remove particulate from vapor stream entering compressor 140. As shown in FIG. 6, the filtration unit 610 is provided with a filtration pad 620. The vapor stream enters the filtration unit 610 below filtration pad 620. The vapor stream then moves up through the filtration pad 620 towards the top portion of the filtration unit 610. As the vapor stream moves through the filtration pad 620, at least a portion, and preferably all, of the particulate present in the vapor stream is captured by the filtration pad 620. The filtered vapor stream may then exit the filtration unit 610 via exit port 630. The material of the filtration pad is generally not limited, and may be any material capable of capturing particulate as a vapor stream moves therethrough.

The pressure difference across the filter pad 620 may be continuously measured by pressure gauges 641, 642. When the measured pressure difference reaches a predetermined amount, water, acid or other fluid capable of dissolving the particulate captured in the filtration pad 620 is introduced via a spray nozzle 650 located above the filtration pad 620. This fluid dissolves a significant amount of the captured particulate within the filtration pad 620. The fluid that passes through the filtration pad 620, and which has dissolved or carried therein particulate removed from the filtration pad 620 may then then exit the filtration unit 610 through a drain 660 located at the bottom of the filtration unit 610.

Figure 7:
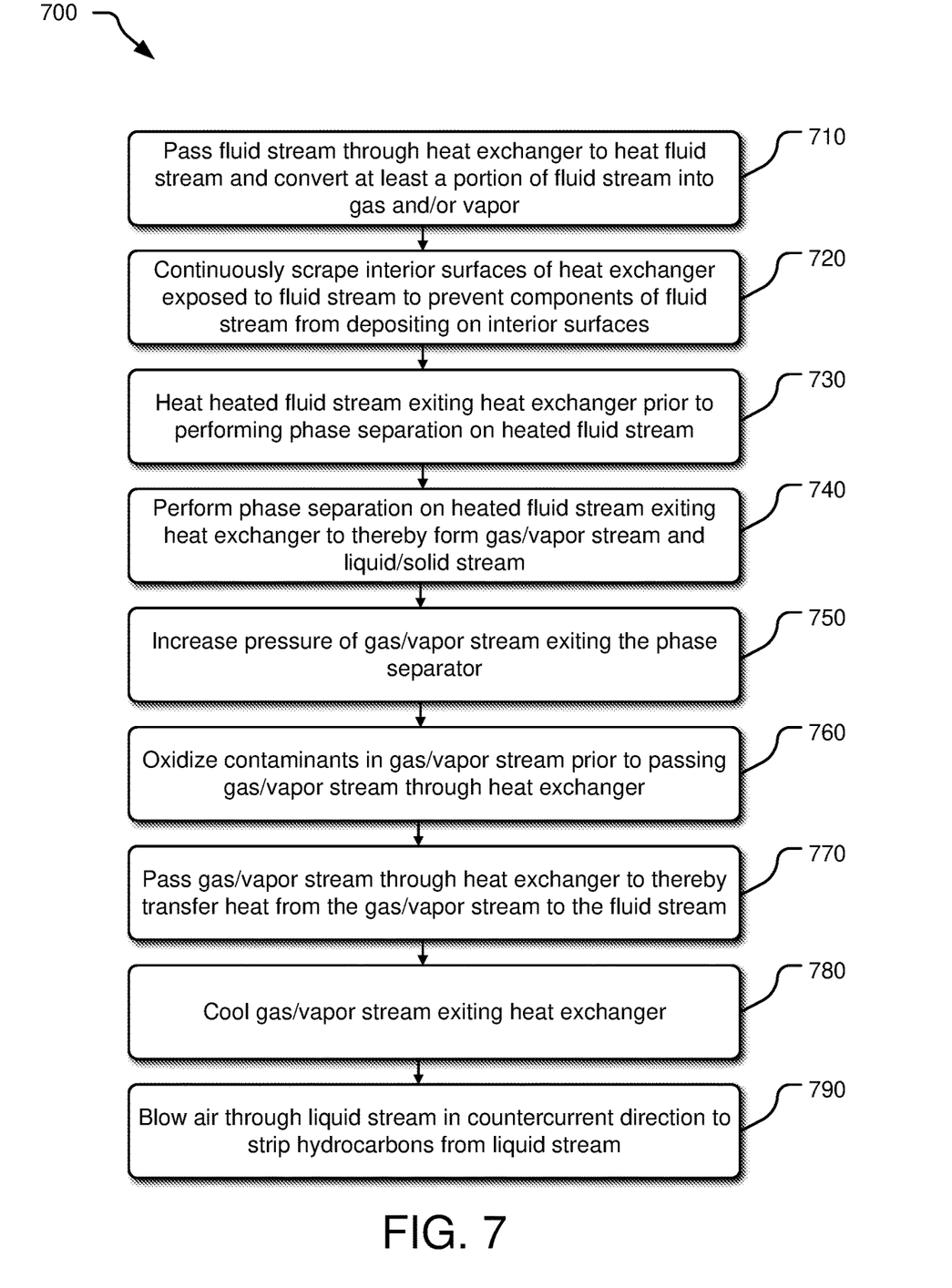
FIG. 7 is a flow chart illustrating a method for separating components from a fluid stream in accordance with various embodiments described herein.

With reference to FIG. 7, a method 700 for carrying out separation of components from fluid streams is illustrated in the form of a flow chart, wherein boxes shown in dashed lines represent optional steps to method 700. The steps of method 700 generally correlate, in some embodiments, to the operation of system 100 described in greater detail above, though it should be appreciated that the steps of method 700 can generally be carried out using any suitable equipment and apparatus, and are not limited to the specific equipment and apparatus that are described with respect to system 100 (except as where specifically noted).

Step 710 of method 700 generally begins with passing a fluid stream through a heat exchanger for the purpose of heating the fluid stream and converting at least a portion of the fluid stream to a vapor stream. In some embodiments, the fluid stream is water based and therefore passing the fluid stream through the heat exchanger results in the conversion of water to steam. The fluid stream may generally include solids and non-evaporable components, and as such, the heated fluid stream that ultimately leaves the heat exchanger may include both a vapor stream as well as solids and non-evaporable components. As described previously, the fluid stream may be produced water from oil and gas recovery, in which case the fluid stream may include, e.g., salts, hydrocarbons, water, other chemicals, etc. The heat exchanger used as part of step 710 is generally not limited, through in some embodiments, the heat exchanger is of a shell and tube-type configuration, with the fluid passing through the tube portion of the heat exchanger and being warmed by a vapor stream flowing counter-currently through the shell portion of the heat exchanger.

In step 720, the interior surface of the heat exchanger, and more specifically in some embodiments, the interior surface of the tube portion of the heat exchanger through which the fluid stream is passed, is continuously scraped. The scraping of the interior of the heat exchanger can be carried out using a scraping system as previously described, though it should be appreciated that other scraping techniques and systems may be used, provided that the scraping is carried out to remove solids and non-evaporable material from the interior walls of the heat exchanger and thereby prevent material buildup that may negatively impact the overall process (e.g., impeding fluid flow though the tube, making heat exchange between the tube and shell less efficient, etc.). While not necessarily a primary feature of the scraping system, the scraping system may also serve to mix the fluid stream passing through the heat exchanger, which may aid in more uniform heating of the fluid stream.

In step 730, which is denoted in FIG. 7 as being an optional step of method 700, the heated fluid stream leaving the heat exchanger (which may include, e.g., steam, unevaporated water, solids, non-evaporable components, hydrocarbons, etc.) is subjected to additional heating. The additional heating of step 730 may be aimed at further evaporation of liquid components of the heated fluid stream leaving the heat exchanger. For example, where the heat exchanger does not result in evaporation of all water in the fluid stream, step 730 may be carried out to attempt to evaporate any remaining water present in the fluid stream leaving the heat exchanger. The specific manner and/or apparatus used for heating in step 730 is generally not limited. System 100 discussed previously uses a boiler for step 730, but it should be appreciated that other apparatus suitable for heating the fluid stream can also be used.

In step 740, the fluid stream including vapor, solids, non-evaporable components, liquids, etc., is subjected to phase separation in order to separate the fluid stream into a vapor stream and a solid/liquid stream. The vapor stream may be free or substantially free of solids and liquids, while the solid/liquid phase may be free or substantially free of vapor. Any equipment suitable for carrying out this phase separation may be used for step 740.

In step 750, the pressure of the vapor phase resulting from the phase separation of step 740 is increased. In some embodiments, the pressure of the vapor stream is increased via the use of a compressor. Because of the sensitivity of equipment used for increasing the pressure of a vapor stream, such as a compressor, some steps may be taken to treat the vapor stream prior to introduction to the pressure-increasing apparatus. In some embodiments, these pretreatment steps include a filtering the vapor stream to ensure no particles that may harm the pressure-increasing apparatus are present in the vapor stream. Pretreatment steps may also include use of a desuperheating unit to ensure that the temperature of the vapor stream is not too high when introduced into the pressure-increasing apparatus.

In step 760, which is denoted in FIG. 7 as being an optional step of method 700, the vapor stream is subjected to oxidation processing such that certain contaminants that may still be present in the vapor stream are oxidized. The specific manner in which this oxidation step is carried out is generally not limited. In the embodiment shown in system 100, an electrochemical cell is used to carry out oxidation, such as via generation of a plasma within the electrochemical cell. However, it should be appreciated that other means for oxidizing contaminants can be used in step 760. Additional methods include exposing the vapor stream to UV light, electromagnetic radiation, or chemical oxidants In step 770, the vapor phase is passed through the heat exchanger of step 710 to thereby transfer heat from the vapor phase to the fluid stream. In embodiments where a tube and shell-type heat exchanger is used, step 770 may entail passing the vapor stream through the shell side of the heat exchanger while fluid stream is passed through the tube side in a counter current direction. In so doing, heat from the vapor stream is transferred to the fluid stream, resulting in both the condensing of the vapor stream into a liquid due to the loss of heat and the evaporation of the fluid stream due to the addition of heat. In some embodiments, it is desirable that step 770 result in the complete condensation of the vapor stream such that the material leaving the, e.g., shell side of the heat exchanger is all or essentially all liquid. In embodiments where the gas/vapor stream is steam based, the liquid leaving the heat exchanger is water, and preferably fresh water or at least water devoid of an appreciable amount of contaminants or other components such that the water can be used for other purposes (e.g., irrigation).

In step 780, which is denoted in FIG. 7 as being an optional step of method 700, the vapor stream leaving heat exchanger (which in most cases will be in the form of a liquid) is subjected to further cooling in order to condense any vapor remaining in the stream. Any suitable methods and apparatus can be used for cooling the stream to promote full condensation.

In step 790, which is denoted in FIG. 7 as being an optional step of method 700, the liquid stream may have air blown therethrough as a further means for removing any remaining contaminants. For example, in embodiments where the liquid stream includes both water and hydrocarbons, blowing air through the liquid stream in a countercurrent direction may aid in stripping hydrocarbons from the liquid stream. Any hydrocarbons stripped from the liquid stream in this manner can be recovered and re-used.

In some embodiments of the systems and methods described herein, a petroleum-fueled reciprocating or turbine generator can be used to provide the electricity to power aspects of the described system. Reciprocating or turbine generators can also be used to directly power various aspects of the systems, such as directly powering the vapor compression operation. This may then beneficially avoid the need for flaring of natural gas accompanying oil production. Furthermore, the exhaust from these generators may be used to pre-heat the fluid stream prior to entry into the system (e.g., prior to entry into the heat exchanger). Such an arrangement would significantly increase the capacity and/or efficiency of the water processing system.

Hydraulic fracturing fluid used to stimulate petroleum reservoirs typically contains some amount of hydrochloric acid. In some embodiments, alkali compounds (e.g., sodium hydroxide) may be added to water containing hydrochloric acid to convert this compound to a salt. This treated water may then by processed by the systems and methods descried herein. Without addition of the alkali, the hydrochloric acid may evaporate with the water, causing incomplete separation from the water stream. Other chemicals may be added to the fluid stream to be treated by the system and methods described herein to achieve similar desirable results prior to entering the fluid stream into the systems and methods described herein. In some embodiments, chemicals are added to the fluid stream to be treated in order to make one or more components of the fluid stream more or less volatile. Chemicals may also be added to the fluid stream to be treated in order to adjusting pH of the fluid stream to be treated. In one non-limiting example, a hydroxide or other base is added to the fluid to be treated to neutralize the pH of the fluid stream to be treated.

As discussed herein, an aim of the systems and methods described herein is to ultimately produce freshwater from an initial fluid stream containing contaminants and other undesirable components. In embodiments where a freshwater stream is produced by the systems and methods described herein, the freshwater may be used for, e.g., irrigation, industrial purposes, or agricultural purposes.

From the foregoing, it will be appreciated that specific embodiments of the invention have been described herein for purposes of illustration, but that various modifications may be made without deviating from the scope of the invention. Accordingly, the invention is not limited except as by the appended claims.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended.

Unless otherwise indicated, all number or expressions, such as those expressing dimensions, physical characteristics, etc., used in the specification (other than the claims) are understood as modified in all instances by the term "approximately". At the very least, and not as an attempt to limit the application of the doctrine of equivalents to the claims, each numerical parameter recited in the specification or claims which is modified by the term "approximately" should at least be construed in light of the number of recited significant digits and by applying rounding techniques. Moreover, all ranges disclosed herein are to be understood to encompass and provide support for claims that recite any and all sub-ranges or any and all individual values subsumed therein. For example, a stated range of 1 to 10 should be considered to include and provide support for claims that recite any and all sub-ranges or individual values that are between and/or inclusive of the minimum value of 1 and the maximum value of 10; that is, all sub-ranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

I claim:

1. A system for separating components from a fluid stream, comprising:
   a heat exchanger comprising:
      a fluid passage;
      a fluid inlet configured for conveying a fluid stream into the fluid passage of the heat exchanger;
      a fluid outlet configured for passing a heated fluid stream out of the fluid passage of the heat exchanger;
      one or more moveable scrapers positioned within the heat exchanger and configured to remove material from one or more surfaces of the fluid passage;
      a vapor passage, at least a portion of which is positioned adjacent the fluid passage such that heat can be transferred from the vapor passage to the fluid passage;
      a vapor inlet configured for conveying a vapor stream into the vapor passage of the heat exchanger;
      a vapor outlet configured for passing a cooled vapor stream out of the vapor passage of the heat exchanger;
   a phase separator comprising:
      an inlet in fluid communication with the fluid outlet of the heat exchanger; and
      an outlet configured for passing a vapor stream out of the phase separator, the outlet being in fluid communication with the vapor inlet of the heat exchanger;
      wherein the phase separator is configured to separate the heated fluid stream into a vapor stream and a liquid/solid stream; and
   a boiler configured to further heat the heated fluid stream prior to the heated fluid stream being transported to the phase separator, the boiler comprising:
      one or more augers or conveyors positioned within the boiler, the one or more augers or conveyors being configured to convey non-flowable components though the boiler.

2. The system of claim 1, wherein the vapor passage is formed concentrically around the fluid passage.

3. The system of claim 1, further comprising:
   a rotating shaft extending the length of fluid passage, the rotating shaft being positioned along a central longitudinal axis of the fluid passage;
   wherein the one or more moveable scrapers are attached to the rotating shaft such that rotation of the shaft moves the movable scraper blades around the circumference of the fluid passage.

4. The system of claim 3, further comprising:
   an external power supply rotating shaft separably coupled with the rotating shaft; and
   wherein the fluid passage comprises an opening through which the rotating shaft may be removed from the fluid passage when decoupled from the external power supply rotating shaft.

5. The system of claim 1, further comprising:
   a compressor configured to increase the pressure of the vapor stream exiting the phase separator.

6. The system of claim 1, further comprising:
   an electrochemical cell configured to oxidize contaminants in the vapor stream by generating a plasma.

7. The system of claim 1, further comprising:
   an air cooler configured for further cooling the cooled vapor stream exiting the steam outlet.

8. The system of claim 1, wherein the cooled vapor stream exiting the vapor passage is in the form of a liquid, the system further comprising:
   a contactor column configured to blow air through liquid cooled vapor stream in a counter current direction to thereby strip hydrocarbons from the liquid cooled vapor stream.

9. The system of claim 1, further comprising:
   an incinerator configured to receive liquid/solid stream produced by the phase separator and incinerate hydrocarbons present in the liquid/solid stream.

10. The system of claim 5, further comprising:
    a filtration system configured to receive the vapor stream from the phase separator and remove particulate from the vapor stream prior to its introduction into the compressor.

11. A method for separating components from a fluid stream, comprising:
    providing the system for separating components from a fluid stream of claim 1;
    passing the fluid stream through the heat exchanger to thereby heat the fluid stream and convert at least a portion of the fluid stream into a vapor;
    while the fluid stream is passing through the heat exchanger, removing material from one or more surfaces of the heat exchanger that are exposed to the fluid stream to prevent components of the fluid stream from depositing on the one or more surfaces;
    in the phase separator, performing phase separation on the heated fluid stream exiting the heat exchanger to thereby form a vapor stream and a liquid/solid stream;
    passing the vapor stream though the heat exchanger to thereby transfer heat from the compressed vapor stream to the fluid stream.

12. The method of claim 11, wherein the heat exchanger is a tube and shell heat exchanger and wherein the fluid stream passes through the tube, the vapor stream passes through the shell, and the vapor stream moves through the heat exchanger in a countercurrent direction to the fluid stream.

13. The method of claim 12, wherein removing material from the one or more surfaces of the heat exchanger comprises continuously scraping the one or more surfaces of the tube portion of the heat exchanger using the one or more moveable scrapers positioned within the heat exchanger.

14. The method of claim 11, further comprising:
    in the boiler, heating the heated fluid stream exiting the heat exchanger prior to performing phase separation on the heated fluid stream.

15. The method of claim 11, further comprising:
    oxidizing contaminants in the vapor stream prior to passing the vapor stream though the heat exchanger.

16. The method of claim 11, further comprising:
    cooling the vapor stream exiting the heat exchanger.

17. The method of claim 16, wherein the vapor stream exiting the heat exchanger is cooled until the vapor stream is converted to a liquid stream, the method further comprising:
    blowing air through the liquid stream in a countercurrent direction to thereby strip hydrocarbons from the liquid stream.

18. The method of claim 13, wherein the one or more moveable scrapers positioned within the heat exchanger comprises a series of scrapers attached to a rotating shaft extending the length of the tube and positioned along a central longitudinal axis of the tube.

\* \* \* \* \*